Figure 1:
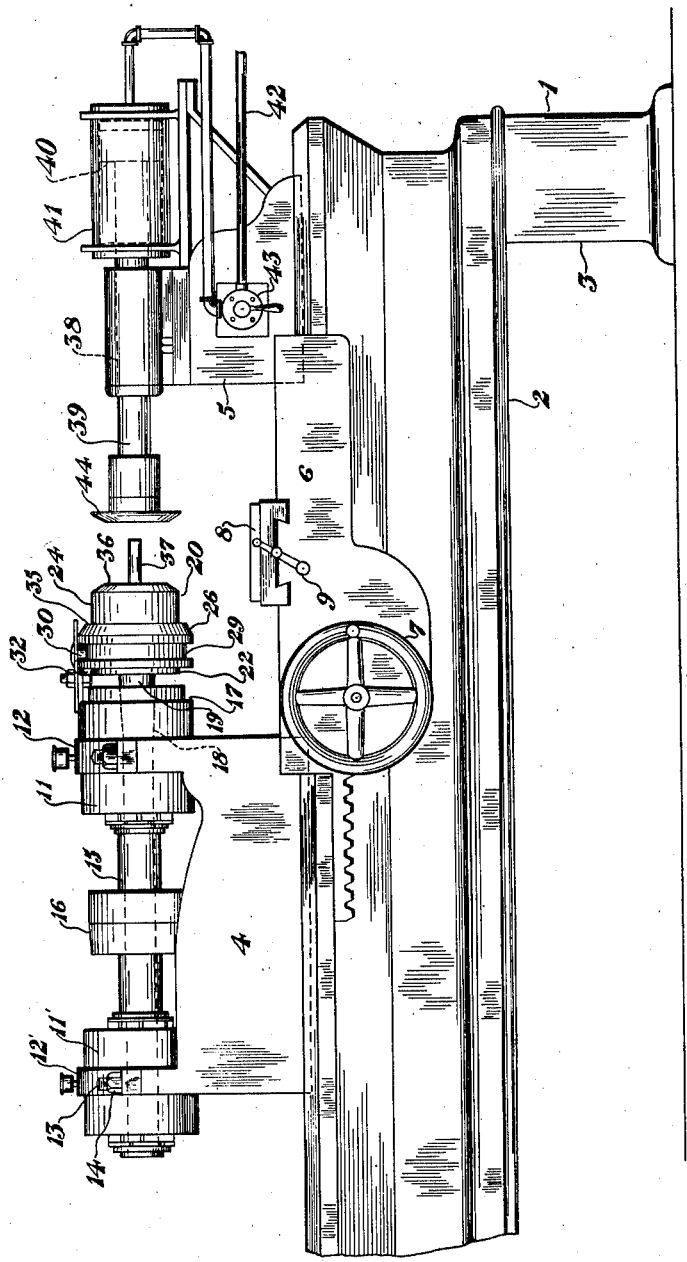

Aug. 7, 1928.

R. G. NELSON 1,680,061

SPUN METAL MANUFACTURE AND PRODUCT

Filed Sept. 16, 1926     5 Sheets-Sheet 1

Inventor

*R. G. Nelson*

By *Freas and Boud*

Attorneys

Aug. 7, 1928.

R. G. NELSON 1,680,061

SPUN METAL MANUFACTURE AND PRODUCT

Filed Sept. 16, 1926          5 Sheets-Sheet 3

Inventor
R. G. Nelson
By Fresh and Bond
Attorneys

Aug. 7, 1928.

R. G. NELSON 1,680,061

SPUN METAL MANUFACTURE AND PRODUCT

Filed Sept. 16, 1926    5 Sheets-Sheet 4

Inventor
R. G. Nelson
By Freast and Bond
Attorney

Aug. 7, 1928.

R. G. NELSON 1,680,061

SPUN METAL MANUFACTURE AND PRODUCT

Filed Sept. 16, 1926   5 Sheets-Sheet 5

Inventor

R. G. Nelson

By Freas and Bond
Attorneys

Patented Aug. 7, 1928.

1,680,061

UNITED STATES PATENT OFFICE.

REYNOLD G. NELSON, OF CANTON, OHIO, ASSIGNOR TO THE SPUN STEEL CORPORATION, OF CANTON, OHIO, A CORPORATION OF OHIO.

SPUN METAL MANUFACTURE AND PRODUCT.

Application filed September 16, 1926. Serial No. 135,852.

My invention relates to spinning as from blank disks of sheet or strip metal, articles of manufacture having a wheel disk and one or more relatively narrow and relatively deep annular grooved flanges integral with the wheel disk, such as V pulleys, and the like.

Pulleys having peripheral flanges containing one or more relatively narrow and relatively deep annular grooves therein, such as V grooves, have heretofore been made by first casting a rough V pulley wheel and then machine finishing the grooves and other parts thereof. Such cast and machined pulleys require a relatively long time for their production, and a relatively excessive weight of material, and are very difficult to balance dynamically.

Metal spinning manufacture has heretofore been principally directed to the spinning of articles such as kitchen utensils and the like from the lighter gauges, as 16 gauge and thinner, of sheets or strips of the soft metals such as brass, aluminum, and the like.

In a companion application filed September 9, 1926, Serial No. 134,432 for metal spinning apparatus, I disclose apparatus for spinning from the heavier gauges, as 16 gauge and thicker and including quarter inch thick sheets or strips, not only of the soft metals such as brass, aluminum, and the like, but also of steel, articles of manufacture such as crown pulleys having tubular portions and one or more flange portions integral therewith, the improved metal spinning apparatus therein set forth being adapted for completely spinning a pulley or the like during a continuous rotation of the spinning arbor of the apparatus, being adapted for convenient control and operation, and enabling the production of crown pulleys and the like in small quantities at a cost less than the cost of making such articles by the use of relatively expensive dies in punch presses, draw presses, and the like.

The metal spinning apparatus of my aforesaid companion application is not however conveniently and immediately adaptable for the spinning of V pulleys as herein set forth.

Accordingly the objects of the present improvements are:

First, to provide an integral roller spun metal V grooved pulley as aforesaid, preferably spun from the heavier gauges, as 16 gauge and thicker and including quarter inch thick sheets or strips, not only of the soft metals such as brass, aluminum and the like, but also of steel, the roller spun metal V grooved pulley being completely finished, and substantially dynamically balanced;

Second, to provide improvements for the metal spinning apparatus of my companion application as aforesaid for adapting the same for completely spinning, finishing, and substantially dynamically balancing a V pulley or the like during a continuous rotation of the spinning arbor of the improved apparatus;

Third, to provide improved control and operating means for the improved metal spinning apparatus as aforesaid;

Fourth, to provide improved metal spinning apparatus enabling production of articles of manufacture such as V pulleys as aforesaid in small quantities at a cost less than the cost of making such articles by the use of relatively expensive dies in punch presses, draw presses, and the like;

Fifth, to provide an improved method of roller spinning, which includes rotating material to be spun, applying radial pressure to the rotating material, and applying an axially directed thrust to the rotating material during the application of the radial pressure; and Sixth, to provide an improved apparatus for carrying out the improved roller spinning method as aforesaid, and which apparatus preferably includes an air cylinder or the like and a cooperating piston for applying the axially directed thrust to the rotating material.

These and ancillary objects are attained in the present improvements by a construction and arrangement which may be described in general terms as including a bed having operatively mounted thereon an improved spinning headstock provided with a spindle drive shaft journalled in roller bearings for resisting thrust and axial loads, as set forth in my companion application, the spindle shaft being adapted to receive and rotate an improved spinning arbor herein set forth in detail, and being an improvement of the spinning arbor disclosed in my companion application, and having an improved sliding spinning form and thrust sleeve thereon, and the bed also having operatively mounted thereon an improved tailstock including improved means such as a compressed air cylinder and piston for operating an improved pulley forming thrust head in cooperation with the spinning arbor, together with a turret tool holder for a plurality of rotary spinning tools all mounted on ball or roller bearings as set forth in my companion application.

Figure 2:
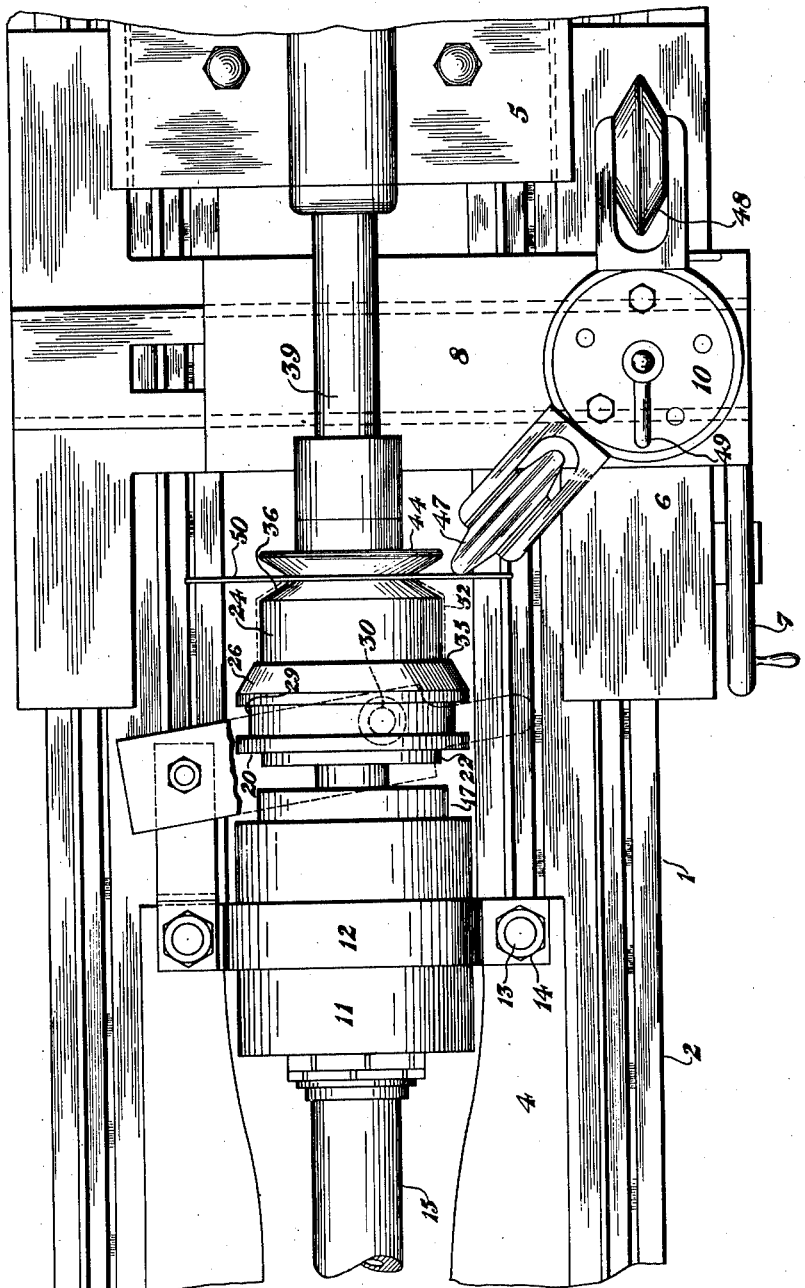
Figure 3:
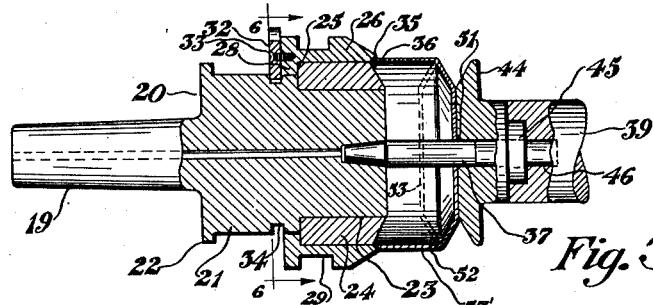
Figure 4:
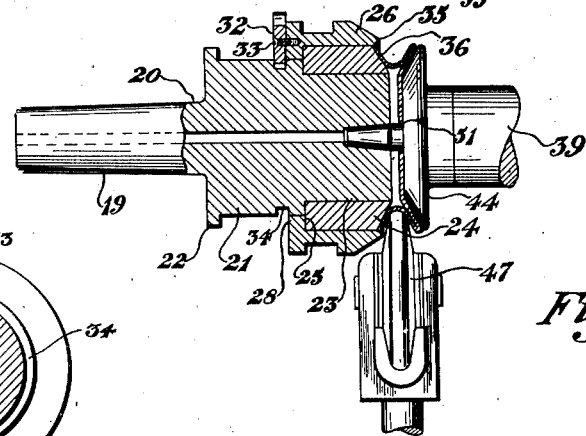
Figure 6:
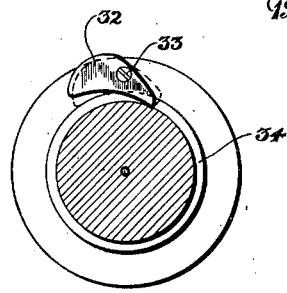
Figure 5:
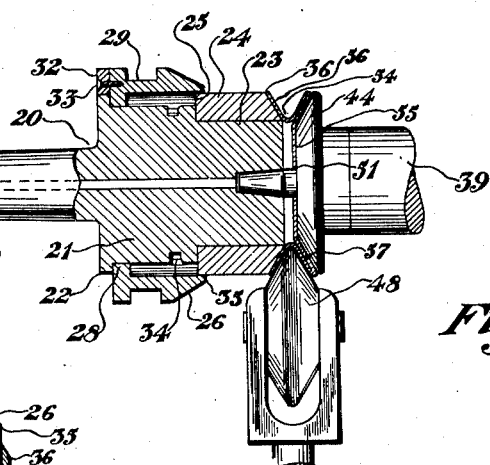
Figure 7:
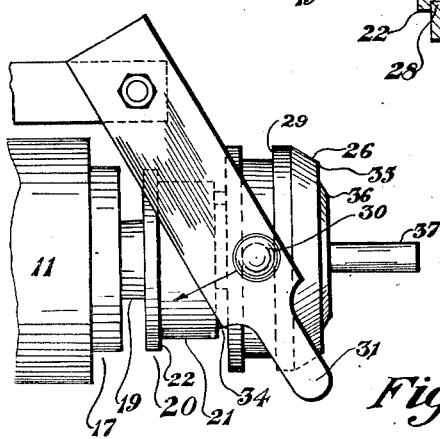
Figure 8:
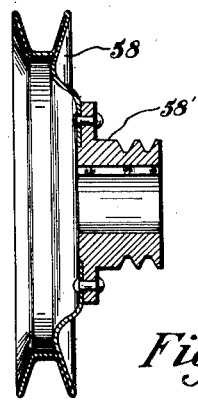
Figure 11:
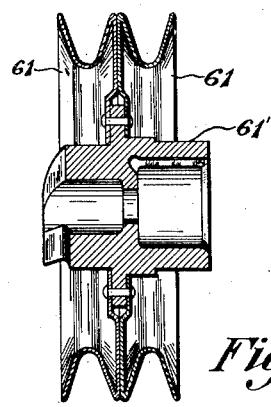
Figure 9:
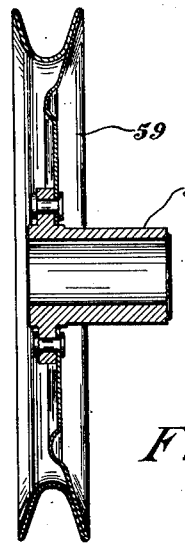
Figure 12:
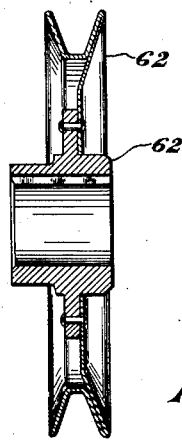
Figure 10:
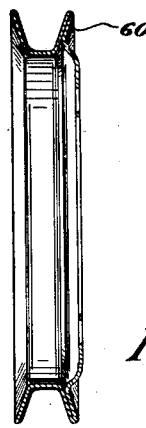
Figure 13:
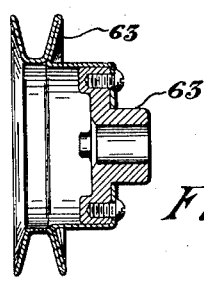
Figure 14:
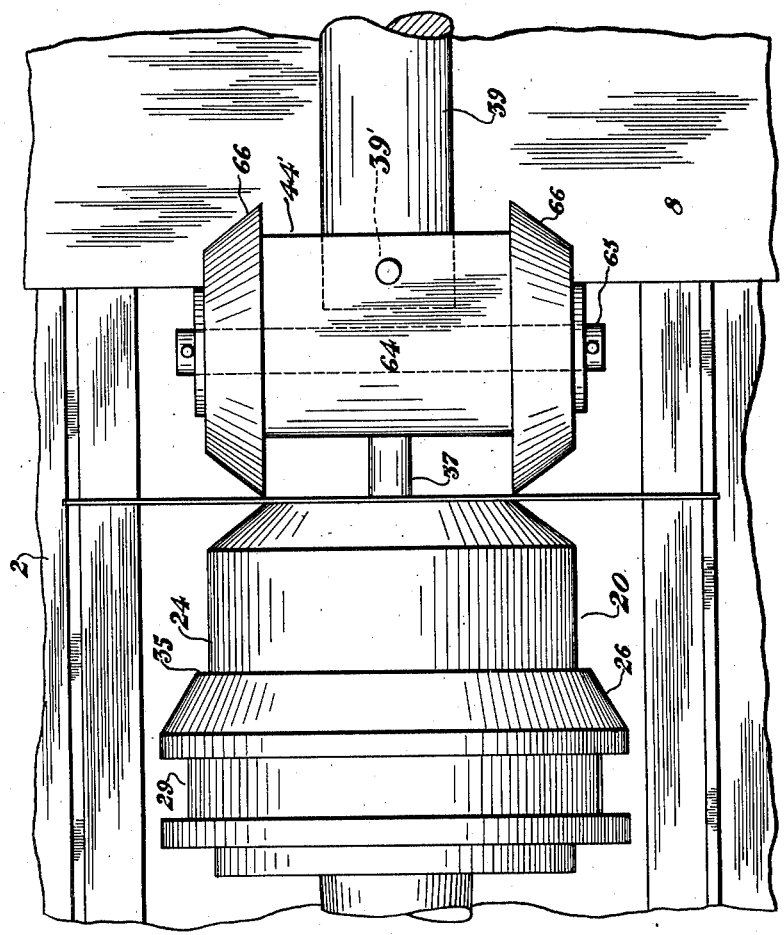

A preferred embodiment of the invention is illustrated in the accompanying drawings forming part hereof in which Figure 1 is a fragmentary side elevation of the improved metal spinning apparatus, the turret tool holder being removed;

Fig. 2, an enlarged fragmentary plan view thereof, the turret tool holder being in place, and the apparatus being set up for starting the spinning, finishing, and substantially dynamically balancing of a V pulley complete from a blank disk during a continuous rotation of the spinning arbor by the use of the various tools in the turret tool holder;

Fig. 3, a detached fragmentary plan view, with portions in section, of the improved arbor and tailstock thrust head, ready for a thrusting movement axial of the arbor of the thrusting head;

Fig. 4, a similar view at the completion of the roller spinning operations of the first spinning tool;

Fig. 5, a similar view at the completion of the roller spinning operation of the finishing spinning tool;

Fig. 6, a sectional view of the arbor as on line 6—6, Fig. 3;

Fig. 7, a detached fragmentary plan view of the improved arbor and the sleeve sliding lever therefor;

Figs. 8, 9, 10, 11, 12, and 13, transverse vertical cross-sections of various forms of V pulleys embodying the present invention and made by utilizing the improvements in pulley manufacture herein set forth; and Fig. 14, a detached enlarged fragmentary plan view of the apparatus provided with a modified form of thrust head.

Similar numerals refer to similar parts throughout the drawings.

The improved metal spinning apparatus indicated generally at 1 includes a bed 2 supported by suitable legs 3, and the bed 2 may be of any desired length. An improved spinning headstock 4 is adjustably mounted in a well-known manner at a desired longitudinal location upon the bed 2, and an improved tailstock 5 is likewise adjustably mounted upon the bed in a well-known manner at a desired longitudinal location adjacent the headstock.

Between the headstock and the tailstock a longitudinal feed carriage 6 is mounted in a well-known manner for longitudinal movement between the headstock and the tailstock by rotation of the longitudinal feed carriage control wheel 7. A cross feed carriage 8 is mounted upon the longitudinal feed carriage 6 for cross movement in a well-known manner by operation of the cross feed carriage crank 9 and the turret tool holder 10 is mounted on the cross feed carriage 8.

For resisting both thrust and radial loads, the improved headstock 4 is provided at its ends with roller bearings 11 and 11' removably secured thereon, as by caps 12 and 12' and cooperating studs 13 and nuts 14. A spindle drive shaft 15 is journalled in the spaced bearings 11 and 11' and has keyed thereon between the bearings a drive pulley 16 for operative connection as by a belt, not shown, with a power shaft. At the spinning end 17 of the headstock the spindle shaft 15, which is preferably tubular, is provided with an inner taper 18 for receiving and fitting with the tapered end 19 of the improved spinning arbor 20.

The improved spinning arbor 20 includes, axial with the tapered end 19, a cylindric sleeve bearing 21 preferably having an outwardly extending stop flange 22 adjacent the tapered end 19. The sleeve bearing is preferably provided with a form ring bearing outer end 23 having a diameter less than the diameter of the body of the sleeve bearing 21. Upon the form ring bearing 23 a form ring 24 preferably made of hardened tool steel is secured, and the outer periphery of the ring 24 extends beyond the outer periphery of the sleeve bearing 21, thereby providing an outer sleeve stop 25.

A spinning form and thrust sleeve 26 is slidably mounted on the sleeve bearing 21 and the form ring 24, and is provided with an inwardly projecting sleeve flange 28 for abutting against the sleeve stop flange 22 of the sleeve bearing 21 and the forward stop 25 of the form ring or die 24. The sleeve 26 is provided with an annular groove 29 for receiving a sleeve sliding finger 30 secured in the end of a lever 31 pivotally mounted at the spinning end of the headstock for selective engagement of the finger 30 with the sleeve groove 29 to slide the sleeve upon the sleeve bearing and form ring as desired while the arbor is being continuously rotated.

At the flange end of the sleeve 26, a centrifugally operated dog 32 is pivotally secured to the sleeve as by a screw 33, the axis of the pivotal mounting being located away from the center of gravity of the dog, so that one end of the dog will fly outward upon rotation of the sleeve, and the other end will extend inward for entering an annular groove 34 in the sleeve bearing 21, so spaced that when the dog end is in the groove, the outer end 35 of the sleeve will be maintained in a desired relationship with the outer end 36 of the form ring or die. The sleeve bearing is also preferably provided with a pilot pin 37 axial therewith and having a tapered end removably secured in the outer end of the sleeve bearing, and the pin extending outward therefrom for purposes hereinafter to be set forth in detail.

For clamping material to be spun against the outer end of the arbor 20, and for applying a preferably yielding axially directed thrust upon the material to be spun upon the arbor, the improved tailstock 5 is provided with a longitudinal aperture 38 axial with the arbor and spindle shaft, and in which aperture piston rod 39 is slidably mounted, and the piston rod is provided at its outer end with a piston 40, preferably operatively mounted in a cylinder 41 for yielding actuation in a usual manner by means of a compressible medium as air and the like, admitted to the cylinder through a supply line 42, having a control valve 43 therein and conveniently mounted upon the tailstock, whereby air may be admitted to the cylinder to move the piston rod longitudinally towards or away from the arbor.

Upon its end adjacent the headstock, the piston rod 39 is provided with a form and thrust head or die 44 preferably mounted upon the rod by means of a bearing 45 of a ball or roller type, adapted for receiving radial and thrust loads.

In the thrust head or die 44 and the rod 39 an axial aperture 46 is provided for receiving the pilot pin 37 extending outwardly from the arbor 20, as aforesaid.

The turret tool holder 10, mounted upon the cross feed carriage 8, is provided with a plurality of rotary spinning tools 47 and 48 mounted on ball or roller bearings, and adapted for selective operation by rotation of the turret head of the tool holder by means of a suitable turret handle 49.

The improved metal spinning apparatus thus described in detail, may be used for carrying out the improved methods for completely spinning, finishing, and substantially dynamically balancing a V pulley or the like, during a continuous rotation of the spinning arbor of the improved apparatus.

A blank pulley disk 50 is provided with a central aperture 51 for fitting upon the pilot pin 37 extending outwardly from the arbor 20.

As illustrated in Fig. 2, the disk 50 is securely clamped against the outer end of the arbor by admitting air to the cylinder 41 to advance the piston rod longitudinally against the disk abutting the arbor.

The turret tool holder 10, carrying the plurality of rotary ball or roller bearing mounted spinning tools 47 and 48 as aforesaid, is then set up as illustrated in Fig. 2, with the first rotary spinning tool 47 arranged with its axis of rotation angled to the arbor axis. The first spinning tool 47 has preferably a wedge shaped outer periphery, having a relatively blunt and curved apex for the wedge, as shown.

The spindle shaft is then continuously rotated, preferably at a speed of 1500 to 1800 R. P. M., and the sleeve 26 having been retracted against the sleeve stock flange 22, by operation of the lever 31, and the outer surface of the disk having been preferably coated with a film of oil, having a sufficiently heavy body to remain on the disk during its rotation without being thrown therefrom by centrifugal force, and with the first spinning tool 47 angled as aforesaid, the operator turns the longitudinal feed carriage control wheel 7 and the cross feed carriage crank 9 to longitudinally and transversely bring the rotary spinning tool 47 into contact with the blank disk and spin the same down as to the form illustrated in dotted lines at 52 in Fig. 2, which is the same form illustrated in full lines in Fig. 3.

The air valve 43 and the lever 31 are then operated to slide the sleeve 26 towards the tailstock, whereby the continuously rotating, partially formed blank 52 is longitudinally positioned as indicated in Fig. 3, the centrifugally operated dog 32 locking the sleeve 26 in the desired position.

Air is then admitted to the cylinder 41 to advance the thrust head or die 44 towards the arbor, whereby the partially formed blank 52 is subject to a yielding axially directed thrust, causing the blank to assume the shape indicated in dotted lines at 53 in Fig. 3.

The turret tool holder is then operated so that the axis of rotation of the tool 47 is set parallel with the arbor axis and with the thrust head still exerting a yielding, axially directed thrust upon the partially formed blank 53, the longitudinal feed carriage control wheel 7 is then turned by the operator to apply a radial spinning pressure by means of the tool 47 to the tubular portion 53' of the partially formed blank 53, whereby the simultaneously applied radial spinning pressure and axially directed thrust upon the continuously rotating blank causes the same to assume the form illustrated in Fig. 4.

The first spinning tool 47 may then be withdrawn and the finishing roller spinning tool 48 having the shape of the groove to be formed may then be applied in a similar manner to finally finish, spin and dynamically balance the V groove pulley 54, as illustrated in Fig. 5; during which operation the axially directed thrust pressure of the ring or die 24 and the head or die 44, are applied to the material opposite the sides of the final groove forming roll 48.

During the operation illustrated in Fig. 4, the sleeve 26 is locked in the position advanced toward the tailstock, but during the operation illustrated in Fig. 5, the sleeve 26 is retracted towards the headstock.

The pulley 54 includes a wheel disk 55 and a peripheral flange 56 integral with the wheel disk and having a relatively narrow and relatively deep V groove therein, outer surface portions of the flange abutting surface portions of the wheel disk, as indicated at 57. The pulley 54 after removal from the spinning apparatus, may be mounted upon any desired hub.

Figs. 8, 9, 10, 11, 12 and 13 illustrate respectively modified forms of pulleys 58, 59, 60, 61, 62, and 63, made by slightly modified forms of spinning tools and arbors in the spinning apparatus described as aforesaid.

Pulleys 58, 59, 61, 62 and 63 are illustrated as being provided respectively with suitable hubs 58′, 59′, 61′, 62′ and 63′. Two of the pulleys 61 are combined with the hub 61′ to form a double V groove pulley wheel.

Fig. 14 illustrates a modified form of thrust head, indicated generally at 44′, adapted for minimizing friction losses, thereby reducing the diameter of the air cylinder required for advancing and retracting the thrust head.

The modified thrust head 44′ includes a transversely extending bearing head 64 pinned to the end 39′ of the piston rod 39 nearest the arbor 20. A transversely extending forming wheel shaft 65 is mounted in the bearing head 64, and has journaled on each of its outer ends conical forming wheels 66, for use in a manner similar to the heretofore described method of using the thrust head 44.

I claim:

1. A pulley and the like made of sheet or strip metal of sixteen gauge or thicker including a wheel disk, and a peripheral flange integral with the wheel disk and having a relatively narrow and relatively deep groove roller spun therein.

2. A pulley and the like made of sheet or strip metal of sixteen gauge or thicker including a wheel disk, and a peripheral flange integral with the wheel disk and having a relatively narrow and relatively deep V groove roller spun therein.

3. A pulley and the like made of sheet or strip metal of sixteen gauge or thicker including a wheel disk, and a peripheral flange integral with the wheel disk and having a relatively narrow and relatively deep groove roller spun therein, surface portions of the flange abutting surface portions of the wheel disk.

4. The method of roller spinning a sheet or strip metal pulley and the like to form a relatively narrow and relatively deep groove in a peripheral cylindric flange on an integral disk wheel blank, which includes rotating the blank on its axis, applying radial roller pressure to rough form the groove, then finally applying radial pressure of a roller having the shape of the groove to be formed, and at the same time applying axially directed die thrust pressure to the material opposite the sides of the final groove forming roller.

5. The method of roller spinning a sheet or strip metal pulley and the like to form a relatively narrow and relatively deep groove in a peripheral cylindric flange on an integral disk wheel blank, which includes rotating the blank on its axis, applying radial pressure of a roller having the shape of the groove to be formed, and at the same time applying axially directed die thrust pressure to the material opposite the sides of the groove forming roller.

In testimony that I claim the above, I have hereunto subscribed my name.

REYNOLD G. NELSON.